United States Patent
Tokumoto

(10) Patent No.: US 7,227,831 B2
(45) Date of Patent: Jun. 5, 2007

(54) RECORDING MEDIUM, RECORDING AND REPRODUCTION APPARATUS, AND RECORDING AND REPRODUCTION METHOD

(75) Inventor: Yoshiyuki Tokumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 10/878,256

(22) Filed: Jun. 29, 2004

(65) Prior Publication Data

US 2005/0030864 A1 Feb. 10, 2005

(30) Foreign Application Priority Data

Jun. 30, 2003 (JP) .............................. 2003-188343

(51) Int. Cl.
G11B 7/24 (2006.01)
G11B 5/09 (2006.01)

(52) U.S. Cl. .............................. 369/275.1; 369/275.3; 369/53.2; 369/53.37

(58) Field of Classification Search ..................... None
See application file for complete search history.

(56) References Cited

U.S. PATENT DOCUMENTS

2004/0032813 A1* 2/2004 Lee et al. ................. 369/275.3

2004/0125738 A1* 7/2004 Lee et al. ................. 369/275.3

FOREIGN PATENT DOCUMENTS

| EP | 0 715 301 A2 | 6/1996 |
| EP | 0 817 195 A2 | 1/1998 |
| EP | 1 056 089 A1 | 11/2000 |

\* cited by examiner

*Primary Examiner*—Muhammad Edun
(74) *Attorney, Agent, or Firm*—Oblon, Spivak, McClelland, Maier & Neustadt, P.C.

(57) ABSTRACT

In a rewritable recording medium, in which the opposite track path is adopted, having a plurality of recording layers, the confirmation of the formation of a middle area is made to be faster and easier. Within a predetermined management information area (e.g., lead-in) of a disc, intermediate-area management information (middle status) indicating whether or not a guard intermediate area (middle area) whose one end is the inter-layer transition position (inter-layer loop-back address) which is determined according to the recording of user data is recorded. As a result, it is possible for a recording and reproduction apparatus to determine whether or not the middle area needs to be formed on the basis of the value of the intermediate-area management information.

8 Claims, 15 Drawing Sheets

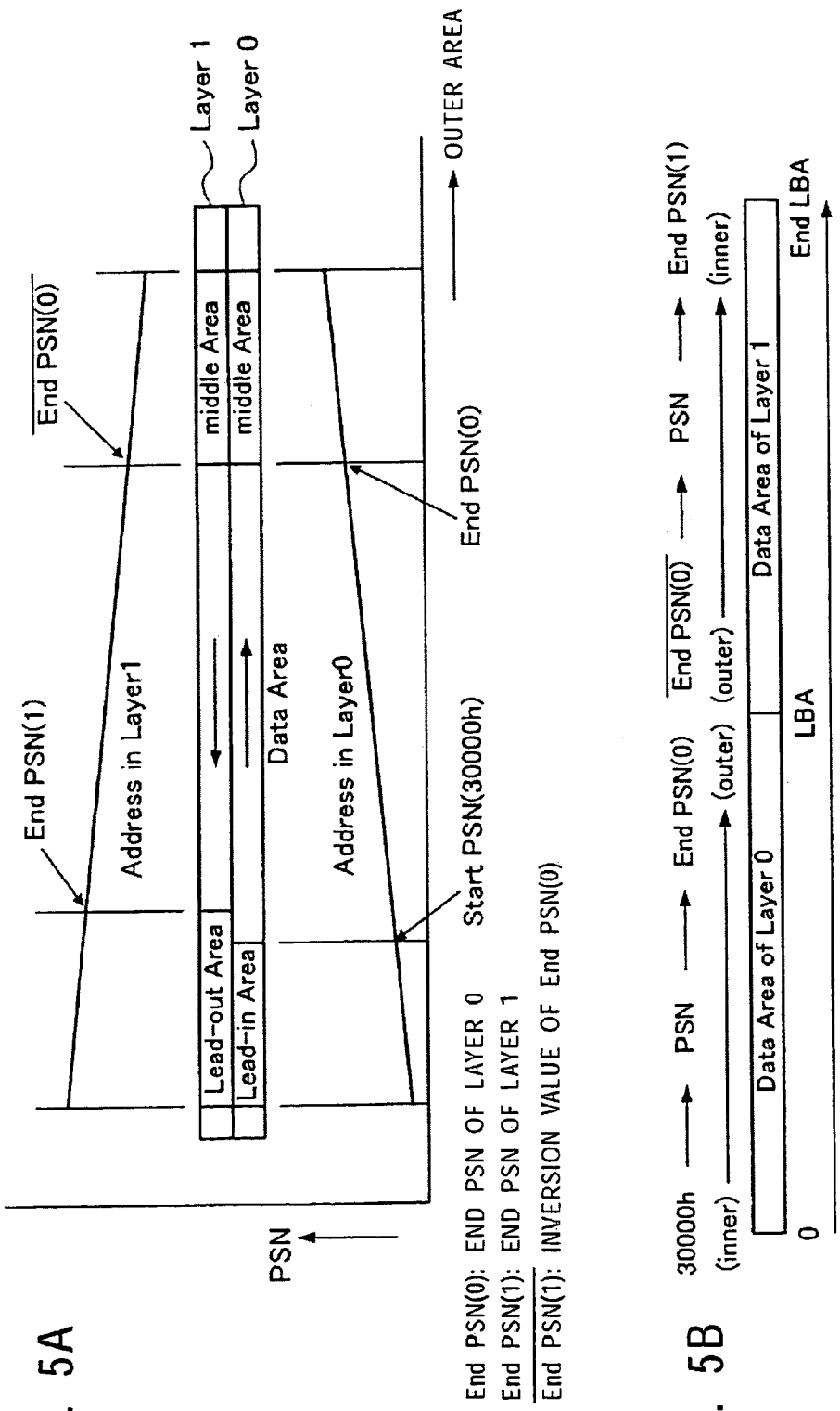

FIG. 8

| BYTE POSITIONS | CONTENT | NUMBER OF BYTES |
|---|---|---|
| 0 | Disc Category and Version Number | 1 |
| 1 | Disc size | 1 |
| 2 | Disc structure | 1 |
| 3 | Recording density | 1 |
| 4 to 15 | Data Zone allocation | 12 |
| 16 | Set to (00) | 1 |
| 17 | Disc Application Code | 1 |
| 18 | Extended Information Indicators | 1 |
| 19 to 26 | Disc Manufacture ID | 8 |
| 27 to 29 | Media type ID | 3 |
| 30 | Product revision number | 1 |
| 31 | number of Physical format information bytes in use in ADIP up to byte 63 | 1 |
| 32 | Recording velocity range for the basic write strategy | 1 |
| 33 | Maximum read power at Reference velocity | 1 |
| 34 | PIND at Reference velocity | 1 |
| 35 | $\rho$ at Reference velocity | 1 |
| 36 | $\varepsilon 1$ at Reference velocity | 1 |
| 37 | $\varepsilon 2$ at Reference velocity | 1 |
| 38 | $\gamma$ target at Reference velocity | 1 |
| 39 | Maximum read power at Upper velocity | 1 |
| 40 | PIND at Upper velocity | 1 |
| 41 | $\rho$ at Upper velocity | 1 |
| 42 | $\varepsilon 1$ at Upper velocity | 1 |
| 43 | $\varepsilon 2$ at Upper velocity | 1 |
| 44 | $\gamma$ target at Upper velocity | 1 |
| 45 | Maximum read power at Intermediate velocity | 1 |
| 46 | PIND at Intermediate velocity | 1 |
| 47 | $\rho$ at Intermediate velocity | 1 |
| 48 | $\varepsilon 1$ at Intermediate velocity | 1 |
| 49 | $\varepsilon 2$ at Intermediate velocity | 1 |
| 50 | $\gamma$ target at Intermediate velocity | 1 |
| 51 | Ttop first pulse duration | 1 |
| 52 | Ttop multi pulse duration | 1 |
| 53 | dTtop first pulse lead time | 1 |
| 54 | dTera erase lead time at Reference velocity | 1 |
| 55 | dTera erase lead time at Upper velocity | 1 |
| 56 | dTera erase lead time at Intermediate velocity | 1 |
| 57 to 63 | Reserved-All(00) | 7 |
| 64 to 95 | Extended Information block 0 | 32 |
| 96 to 127 | Extended Information block 1 | 32 |
| 128 to 159 | Extended Information block 2 | 32 |
| 160 to 191 | Extended Information block 3 | 32 |
| 192 to 223 | Extended Information block 4 | 32 |
| 224 to 255 | Extended Information block 5 | 32 |

FIG. 9

| | BYTE POSITION | CONTENT | NUMBER OF BYTES |
|---|---|---|---|
| BYTE POSITIONS 4 TO 15 | 4 | set to (00) | 1 |
| | 5 TO 7 | FIRST PSN OF THE DATA ZONE (the first PSN of the Data Zone) | 3 |
| DATA ZONE ALLOCATION | 8 | set to (00) | 1 |
| | 9 TO 11 | LARGEST PSN OF DATA ZONE (the last possible PSN of the Data Zone) | 3 |
| | 12 | set to (00) | 1 |
| | 13 TO 15 | LARGEST PSN OF LAYER 0 (the last possible PSN of Layer 0) | 3 |

FIG. 10

| 1st PSN | SIZE (NUMBER OF SECTORS) | Description |
|---|---|---|
| 1F300h | 45440 | Initial Zone |
| 2A480h | 2048 | Inner Disc Test Zone |
| 2AC80h | 12288 | Inner Drive Test Zone Layer0 |
| 2DC80h | 512 | Guard Zone 1 |
| 2DE80h | 4096 | Reserved Zone 1 |
| 2EE80h | 64 | Reserved Zone 2 |
| 2EEC0h | 256 | Inner Disc Identification Zone |
| 2EFC0h | 64 | Reserved Zone 3 |
| 2F000h | 32 | Reference Code Zone |
| 2F020h | 480 | Buffer Zone 1 |
| 2F200h | 3072 | Control Data Zone |
| 2FE00h | 32 | Buffer Zone 2 |

(1) → 2EEC0h row
(2) → 2F200h row

FIG. 11

| Physical Sector of ECC Block | Main Data byte position | Description |
|---|---|---|
| 0 | D0 to D3 | Content descriptor |
| 0 | D4 to D7 | Unknown content descriptor actions |
| 0 | D8 to D39 | Drive ID |
| 0 | D40 to D43 | FDCB update count |
| 0 | D44 to D47 | Formatting status and mode |
| 0 | D48 to D51 | Last written address |
| 0 | D52 to D55 | Last verified address |
| 0 | D56 to D59 | Bitmap start address |
| 0 | D60 to D63 | Bitmap length |
| 0 | D64 to D95 | Disc ID |
| 0 | D96 to D127 | Application dependent |
| 0 | D128 to D191 | Link of DCBs |
| 0 | D192 to D2047 | Reserved and set to (00) |
| 1 to 9 | D0 to D2047 | Formatting bitmap |
| 10 to 15 | D0 to D2047 | Reserved and set to (00) |

(3) → row D44 to D47

FIG. 12

| Physical Sector of ECC Block | Main Data byte position | Description |
|---|---|---|
| 0 | D44 | Formatting status flags |
| 0 | D45 | Verification status flags |
| 0 | D46 | Recording status flags |
| 0 | D47 | Reserved |

(4) → points to the D46 Recording status flags row

FIG. 13

| Bit position | Description |
|---|---|
| 7 | Lead-in status |
| 6 to 5 | Lead-out status |
| 4 | Middle status |
| 3 to 0 | Reserved |

RECORDING MEDIUM, RECORDING AND REPRODUCTION APPARATUS, AND RECORDING AND REPRODUCTION METHOD

BACKGROUND OF THE INVENTION

1. Field of the Invention

The present invention relates to a recording medium, such as a disc, that has a plurality of information recording layers and on which data can be rewritten; a recording and reproduction apparatus; and a recording and reproduction method, which are compatible with the recording medium.

2. Description of the Related Art

As optical recording media capable of optically recording and reproducing information, optical discs, optical cards, and the like are known. Information is recorded on and reproduced from these optical recording media by using laser light of a semiconductor laser, etc., as a light source and by radiating a very finely focused optical beam via a lens.

In these optical recording media, technology for increasing the recording capacity further has been actively in development. The density of information recorded on a conventional optical disc has been made higher with a view to increasing the recording density on the disc recording surface. For example, attempts for narrowing the track pitch and for increasing the recording density in the direction of the linear velocity in recording and reading scanning have been performed in combination with a shortening of a wavelength of a light source for emitting a recording beam and signal processing of the reproduction system.

However, the shortening of a wavelength of a light source has a limit, that is, up to the ultraviolet region, and the pit size can only be reduced up to the size at which a transfer can be performed on the disc during cutting. As a result, the attempts for increasing the recording density will reach a limit at some future time in the two-dimensional area of the disc.

Accordingly, a technique for achieving a larger capacity has also been considered in a three-dimensional manner. That is, a multilayer disc which is formed in such a manner that information recording layers are layered to increase the density of recording information in the thickness direction of the disc has attracted attention.

The multilayer recording medium in which recording layers are layered have features such that the recording capacity can be doubled according to the number of recording layers and are easy to combine with another high-density recording technology. The multilayer recording media have already been put into practical use as, for example, a DVD (Digital Versatile Disc)—ROMs, which are read-only optical discs.

For example, in U.S. Pat. Nos. 5,682,372, 5,740,136, 5,793,720, and 6,424,614, the configuration of a read-only optical disc having two recording layers, and technology which can be applied to a case in which such an optical disc is recorded and reproduced, have been disclosed.

For the future, in addition to ROM (Read-Only-Media)—type discs, recordable multilayer recording media, in which recordable recording layers of phase-change material, magneto-optical material, die material, etc., are layered, are expected to become commercially practical. For example, speaking of DVD-system discs, realization of multilayer recording layers are also expected in write-once discs called DVD-R, DVD+R, etc., or in rewritable discs called DVD-RW, DVD+RW, DVD+RAM, etc.

In dual-layer discs, as a data recording and reproduction method in each recording layer thereof, a method called a "parallel track path" and a method called an "opposite track path" are known. These methods will be described later with reference to FIGS. 4A, 4B, 5A, and 5B. The opposite track path is such that the address advancing direction is the opposite direction between odd-numbered recording layers and even-numbered recording layers. For example, in the first layer (layer 0), recording or reproduction is performed from the inner area toward the outer area, and thereafter, in the second layer (layer 1), recording or reproduction is performed in loopback from the outer area toward the inner area.

The area structure in a dual-layer disc in the opposite track path is schematically shown in part (a) of FIG. 16. First, in the layer 0, which is the first layer, a lead-in zone is formed in the inner area, and following it, a data zone in which user data is recorded is formed. In this data zone, recording or reproduction is performed from the inner area toward the outer area.

The largest usable address as the data zone (the address in the outermost area where user data recording is possible in the layer 0) is determined in advance, and user data recording is performed up to a required address with the maximum address being the limit. In part (a) of FIG. 16, the address of the end where user data recording is performed in the layer 0 is shown as address UD-END #1.

After reaching this address UD-END #1, the user data recording proceeds to the layer 1, and this time, the recording is performed from the outer area toward the inner area. In the layer 1, the area inner of the end of user data recording is assumed to be a lead-out.

The address UD-END #1 is an address as a position where the recording proceeds from the layer 0 to the layer 1, that is, as an inter-layer transition position.

As shown in part (a) of FIG. 16, in the range which is the area outer from the address UD-END #1, which is an inter-layer transition position, a middle area is formed in both the layers 0 and 1. This middle area has a function as a guard area in which dummy data is recorded continuously to the outer-area end portion where user data is recorded. For example, in a read-only device intended for a ROM-type disc (embossed pit disc), if a non-recorded area where pits are not recorded exists when a recordable disc is loaded, tracking cannot be applied accurately, and a malfunction occurs. For this reason, by considering playback compatibility, a middle area, which is made to be a recorded area by dummy data, is formed.

Here, a data rewritable disc will be considered. In the rewritable disc, for example, as shown in part (a) of FIG. 16, even after the user data #1 is recorded, the content can be deleted to newly write data.

Part (b) of FIG. 16 shows an example in which user data #1 of part (a) of FIG. 16 is deleted so as to be rewritten with user data #2. Part (c) of FIG. 16 shows an example in which user data #1 of part (a) of FIG. 16 is deleted so as to be rewritten with user data #3.

For example, in an example in which the data is rewritten as in part (b) of FIG. 16, the inter-layer transition position moves to address UD-END #2. Furthermore, in an example in which the data is rewritten as in part (c) of FIG. 16, the inter-layer transition position moves to address UD-END #3.

The inter-layer transition position is not constant as in the above-described examples of parts (a), (b), and (c) of FIG. 16 because the position is made the maximum address specified in the disc format, and also, the position is changed according to the amount of user data to be recorded and from instructions from the host (application).

For example, if the address UD-END #3 of part (c) of FIG. 16 is specified as the maximum address at which the user data can be recorded, as shown in parts (a) and (b) of FIG. 16, inter-layer loopback is sometimes performed at address having a smaller value than the maximum address.

That is, part (a) of FIG. 16 shows a case in which the layer 0 is not used up to the maximum address at which the user data can be recorded, and the recording proceeds to the layer 1. Part (b) of FIG. 16 shows a case in which, when user data #1 of part (a) of FIG. 16 is rewritten with user data #2, inter-layer loopback is performed at a lower address. Part (c) of FIG. 16 shows a case in which, when user data #1 of part (a) of FIG. 16 is rewritten with user data #3, inter-layer loopback is performed after the user data is used up to the maximum address of the layer 0, at which the user data can be recorded.

Depending on such user data rewriting, the range of the middle area varies.

On the other hand, in each area (lead-in, data zone, lead-out, middle area), in each sector forming the area, information as zone type indicating area attributes is recorded. This allows each area to be distinguished.

For example, in each sector serving as a lead-in zone, it is shown in the header information thereof that the sector is a sector forming a lead-in zone. Furthermore, in each sector in the data zone, the header information indicates that the sector is a sector forming the data zone. The same applies to the lead-out and the middle area.

Here, it is understood that, when the range of the data zone and the middle area change due to the variation of the inter-layer loopback position in the manner described above, it is necessary to rewrite the header information of the sector according to the change so as to form a new middle area.

When a change is made from part (a) of FIG. 16 to part (b) of FIG. 16, it is necessary to rewrite the attributes of the sector contained in the range A in the figure from the data zone to the middle area. Furthermore, when a change is made from part (a) of FIG. 16 to part (c) of FIG. 16, it is necessary to rewrite the attributes of the sector contained in the range B in the figure from the middle area to the data zone.

Here, the process for rewriting the attributes of the sector contained in the range B in the figure from the middle area to the data zone as shown in part (c) of FIG. 16 is realized by the user data recording itself. That is, since sector recording of the attributes as the user data is performed in the sector which was a middle area, it is not necessary to go through the trouble of rewriting the attribute information of the sector later.

However, the process for rewriting the attributes of the sector contained in the range A in the figure from the data zone to the middle area as shown in part (b) of FIG. 16 must be performed separately from the user data recording. For this reason, the process is performed when a special operation is required, for example, after the user data recording is completed. For example, it is a case in which a finalizing process is performed.

At the time of finalization, processes for finally updating the management information in a lead-in by determining the user data at that time and forming a lead-out are performed. The middle area is also formed if necessary according to the state of the user data recording at that time. That is, a state is reached in which the area after the inter-layer transition position UD-END is correctly a middle area.

In the case of a rewritable disc, unlike a write-once disc, even if it is finalized once, data rewriting thereon is possible.

As described above, since the middle area is formed (the formation of the middle area according to the current inter-layer transition position UD-END), for example, during a specific process such as a finalizing process, there is a time difference from when the user data is recorded until the formation of the middle area in accordance with the user data recording state, and in some cases, the disc before the middle area is formed is ejected from the device. Also, there are cases in which the disc exists in which the middle area in accordance with the user data recording state is not formed due to the operation of turning off the power, power stoppage, etc., during that time.

Due to the above situation, for example, when a finalizing instruction is issued from the host device to the loaded disc, the recording and reproduction apparatus confirms whether or not the middle area (the middle area corresponding to the current inter-layer transition position UD-END) is not yet formed and forms a middle area if necessary.

However, when even the state in which the disc is ejected while the middle area is not formed in the manner described above or even the state such as power stoppage is considered, for determining whether or not the middle area has already been formed, it is necessary to actually access the position at which the middle area should be present in order to reproduce all the middle areas in each layer and to confirm whether or not it is made actually the middle area. Thus, this is a process which takes a very long time.

For this reason, a problem arises in that a processing time including the confirmation of the middle area, such as finalization, becomes longer.

SUMMARY OF THE INVENTION

Accordingly, an object of the present invention is to make a middle area confirmation process easier and to realize speeding up of a specific process such as a finalizing process on a rewritable recording medium that has a plurality of recording layers and in which an opposite track path is adopted.

To achieve the above-mentioned object, in one aspect, the present invention provides a recording medium having a plurality of recording layers, on which data can be rewritten, and on and from which user data is recorded and reproduced by an opposite track path method in which the address advancing direction is the opposite direction between odd-numbered recording layers and even-numbered recording layers, the recording medium including: a guard intermediate area (middle area) to be formed by assuming, as one end, the inter-layer transition position at which the recording proceeds from a certain recording medium to the next recording medium when user data is to be recorded; and a management information-area in which intermediate-area management information indicating whether or not the guard intermediate area has already been formed is to be recorded.

In another aspect, the present invention provides a recording and reproduction apparatus incorporating the recording medium, the recording and reproduction apparatus including: a recording and reproduction section for recording and reproducing data on and from each of the recording layers; a management information updating processing section for updating intermediate-area management information when the guard intermediate area is to be formed according to the user data recording state or when the guard intermediate area is formed; and an intermediate-area formation processing section for determining whether or not the guard intermediate area needs to be formed by referring to the intermediate-area management information and for forming the guard intermediate area according to the determination result.

When the inter-layer transition position changes as a result of recording the user data, the management information updating processing section may record an address value indicating the new inter-layer transition position in the management information area and may update the value of the intermediate-area management information to a value indicating "not yet formed".

The management information updating processing section may update the value of the intermediate-area management information to a value indicating that the guard intermediate area is "formed" in accordance with the fact that the guard intermediate area is formed on the basis of the address value indicating the inter-layer transition position.

In another aspect, the present invention provides a recording and reproduction method incorporating a recording medium, the recording and reproduction method including: a first updating step of updating the value of the intermediate-area management information to a value indicating "not yet formed" when the guard intermediate area is to be formed according to the user data recording state; a determination step of determining whether or not the guard intermediate area needs to be formed by referring to the intermediate-area management information; a forming step of forming the guard intermediate area according to the result of the determination step; and a second updating step of updating the value of the intermediate-area management information to a value indicating "formed" according to the formation of the guard intermediate area.

In the first updating step, when the inter-layer transition position changes as a result of recording the user data, the address value indicating the new inter-layer transition position may be recorded in the management information area, and the value of the intermediate-area management information may be updated to a value indicating that the guard intermediate area is "not yet formed".

In the second updating step, the value indicating the intermediate-area management information may be updated to a value indicating that the guard intermediate area is "formed" according to the formation of the guard intermediate area on the basis of the address value indicating the inter-layer transition position.

That is, in the present invention, in the recording medium of a recordable type such as DVD+RW, having a plurality of recording layers, in which an opposite track path is adopted, intermediate-area management information indicating whether or not the guard intermediate area (middle area) which assumes the inter-layer transition position (inter-layer loopback address) which is determined in accordance with the recording of the user data as one end has already been formed is recorded within a predetermined management information area (for example, lead in).

Therefore, it is possible for the recording and reproduction apparatus to determine whether or not the middle area needs to be formed according to the intermediate-area management information.

In particular, the intermediate-area management information is made to have a value indicating "non-formation" in a state in which the inter-layer transition position changes as a result of user data recording and to have a value indicating "formed" in accordance with the fact that the guard intermediate area is formed on the basis of the address value indicating the inter-layer transition position. As a result, this is appropriate for the above determination.

BRIEF DESCRIPTION OF THE DRAWINGS

FIGS. 5A and 5B are illustrations of an opposite track path;
FIG. 8 is an illustration of PFI by ADIP;
FIG. 9 is an illustration of data zone allocation of the PFI by ADIP;
FIG. 10 is an illustration of lead-in management information;
FIG. 11 is an illustration of format disc control blocks in the management information;
FIG. 12 is an illustration of a formatting status and mode in the management information;
FIG. 13 is an illustration of a recording status flag in the management information.

DESCRIPTION OF THE PREFERRED EMBODIMENTS

The embodiments of the present invention will now be described below in the following order.

1. Disc Structure
  1-1 Area Structure of Recording Layer
  1-2 Dual-layer disc
  1-3 ADIP structure
  1-4 Lead-in management information 2. Disc Drive Unit
  2-1 Unit configuration
  2-2 Processing for middle area 3. Modifications 1. Disc Structure
  1-1 Area Structure of Recording Layer In this embodiment, a DVD (Digital Versatile Disc) is used as an example of a large-capacity disc recording medium, and a disk drive device (to be described later) is assumed to be a device for performing recording on and reproduction from a disc as a DVD.

In the recordable DVD-system disc, a plurality of standards, such as DVD+R, DVD-R, DVD+RW, DVD-RW, and DVD-RAM, exist. Here, a description is given by using DVD+RW, which is a rewritable disc, as an example.

For example, when a disc as DVD+RW is loaded into the disk drive unit (recording device), information unique to the disc is read from the ADIP (ADdress In Pre-groove) information embossed in the wobbling grooves on the recording surface, and it is recognized that the disc is a disc as DVD+RW. The recognized disc is then sometimes ejected from the recording device and loaded into the recording device again. At this time, there are cases in which the disc is loaded into the same recording device again or is loaded into another recording device or reproduction device for data exchange.

By taking such usage into consideration, the DVD logical format is formulated by making recording compatibility and reproduction compatibility smooth among the devices.

Figure 1:
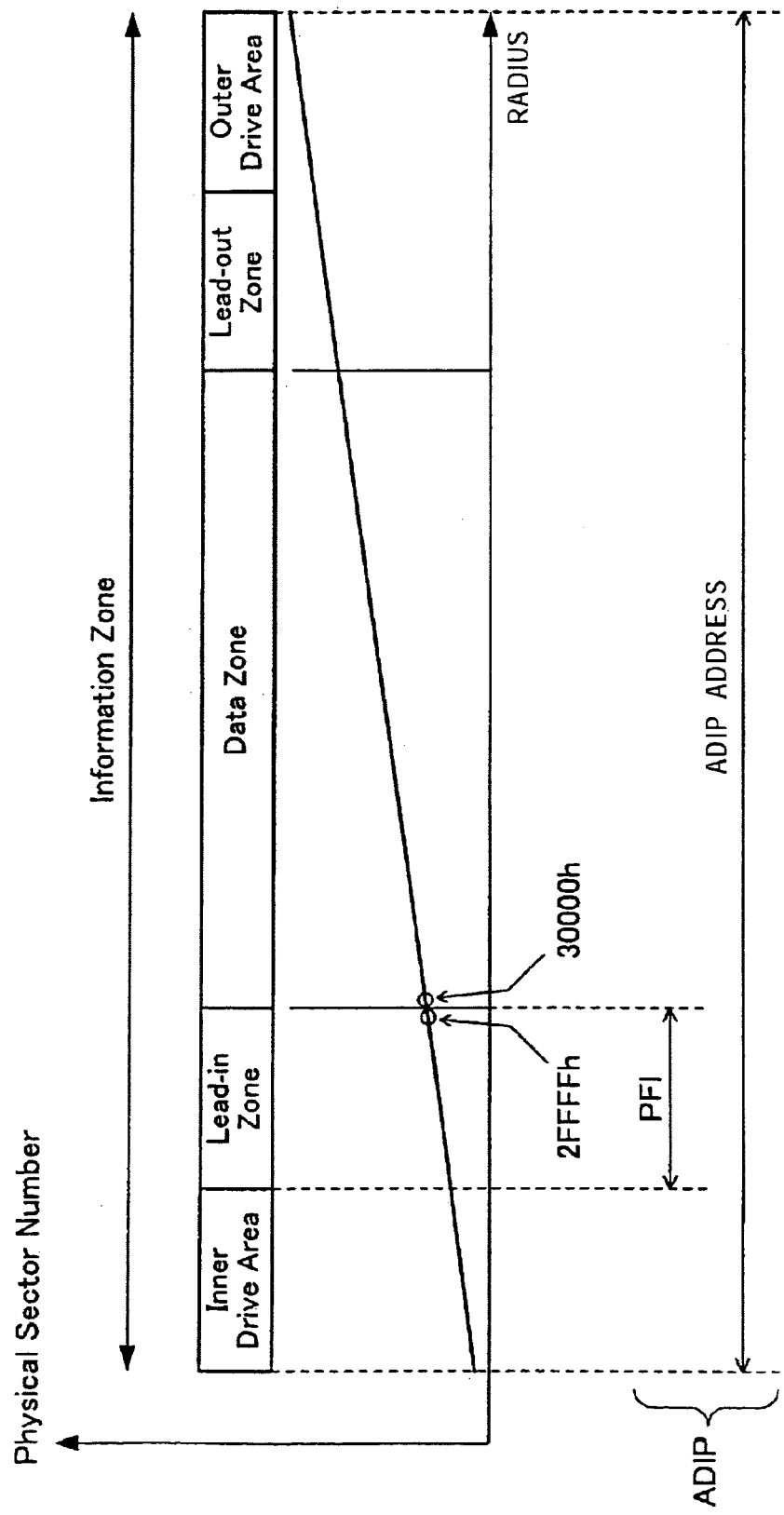
FIG. 1 is an illustration of a disc area structure and a PSN.

First, the layout of the recording layer of DVD+RW is shown in FIG. 1.

As shown in FIG. 1, as the logical data layout in the recording layer of DVD+RW, an information zone is formed from the inner area of the disc toward the outer area. This information zone is an area containing all the information required to ensure data recording compatibility and reproduction compatibility.

The information zone is mainly composed of the following five areas.
(1) Inner drive area
(2) Lead-in zone (also called "lead-in area")
(3) Data zone (also called "data area")
(4) Lead-out zone (also called "lead-out area")
(5) Outer drive area Here, the lead-in zone, the data zone, and the lead-out zone exist in an area which can be accessed even by a read-only device without any trouble.

The inner drive area and the outer drive area are areas which are exclusively used for the recording device. When information is to be recorded, the laser power during recording needs to be adjusted so as to be capable of forming a correct recording mark. For this reason, a test zone which can be used for test recording for determining the optimum recording conditions and an area in which management information related to the recording conditions are formed in the inner drive area and the outer drive area. In the test zone, since the recording state becomes nonuniform due to test recording, there is no guarantee that the test zone is accessed without any trouble by the read-only device. Therefore, the test zone is arranged in an area which cannot be accessed by the read-only device.

A physical sector number. (PSN) is given as absolute position information on the disc.

As shown in FIG. 1, for example, the value of the physical sector number increases from the inner area of the disc toward the outer area. In the case of a DVD+RW disc, PSN=2FFFFh (the numerical value with h is in the hexadecimal notation) is the end of the lead-in zone, and the data zone starts from PSN=30000h.

The data zone is basically an area where user data is written, and in the lead-in zone, management information is written. Furthermore, in the lead-out zone, for example, dummy data is written for the purpose of maintaining compatibility with a read-only disc, and in the case of a DVD+RW disc, there are cases in which management information having substantially the same content as that of the lead-in zone is recorded.

In the DVD+RW disc, the whole information zone is a data rewritable area, and wobbling grooves are formed as recording tracks. By performing tracking along the groove, in a non-recorded area in which pits (phase-change pit marks) are not formed, tracks can be appropriately traced during recording.

Furthermore, as a result of the groove being wobbled, ADIP information is recorded. The physical sector number PSN is recorded as the ADIP address in the information zone. As will be described later, as the ADIP information, in addition to the ADIP address, physical format information called "PFI (Physical Format Information)" is also recorded.

As particularly shown in FIG. 1, PFI is repeatedly recorded as the ADIP information at positions at which a lead-in zone is formed.

With regard to a disc such as DVD+RW, when compatibility with a read-only disc is desired (when playback is made possible also in the read-only device), a finalizing process is performed, so that the management information of the lead-in zone is finally updated, and a process for forming a lead-out zone is performed, completing the configuration shown in FIG. 1.

In the case of a rewritable disc such as DVD+RW, even if the disc is finalized, by deleting the data, new data can be recorded.

Figure 2:
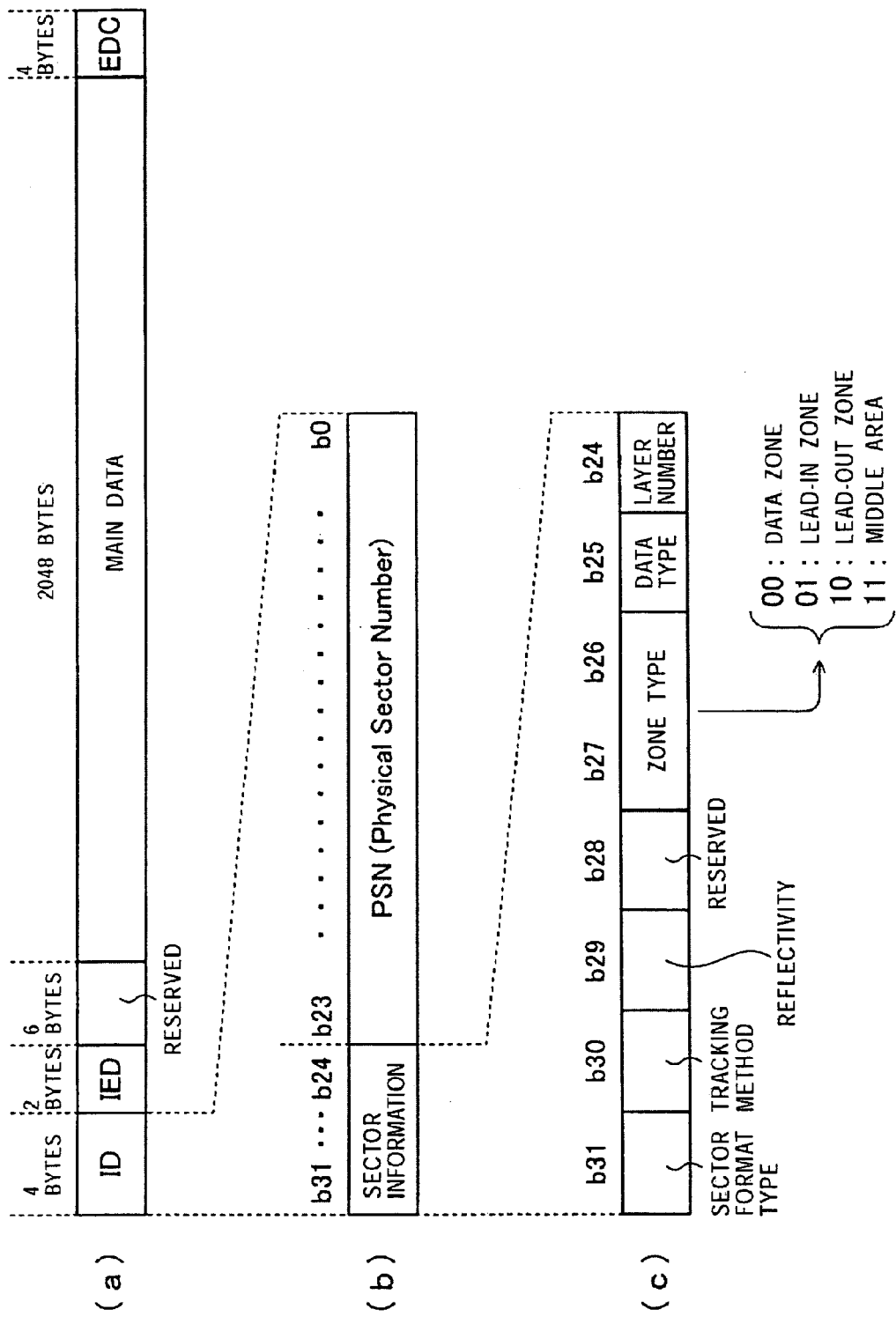
FIG. 2 is an illustration of a sector structure.

Next, FIG. 2 illustrates a sector structure.

Within each zone shown in FIG. 1 above, sectors of the structure of part (a) of FIG. 2 continue.

As shown in part (a) of FIG. 2, one sector is composed of an ID field of 4 bytes, an IED field of 2 bytes, a reserved field of 6 bytes, a main data field of 2048 bytes, and an EDC field of 4 bytes.

In the ID field, the header information of the sector is recorded. In the IED field, an error detection code for the data of the ID field is recorded.

In the main data field, main data of 2048 bytes is recorded. For example, in the sectors in the data zone, user data is recorded as the main data. Furthermore, in the sectors in the lead-in zone, for example, management information of the content shown in FIGS. 10 to 13 (to be described later) is recorded as the main data. In the sectors in the lead-out zone and in the middle area in the case of a dual-layer disc (to be described later), dummy data is recorded as the main data.

In the EDC field, an error detection code for the data from the ID field to the main data field is recorded.

The structure of the ID field is shown in part (b) of FIG. 2.

In the ID field of 4 bytes (32 bits), the PSN (Physical Sector Number) is recorded by 24 bits of bits b0 to b23. That is, it is the physical address of the corresponding sector.

In 8 bits of bits b24 to b31, the sector information is recorded. The content of this sectorin formation is shown in part (c) of FIG. 2. In the bit b24, the layer number of the recording layer including that sector is recorded.

In the bit b25, for example, the data type indicating that the data is rewritable data is recorded.

In the bits b26 and b27, the zone type is recorded, that is, the zone including that sector is indicated. For example, if these two bits are "00", the data zone is indicated; if they are "01", the lead-in zone is indicated; and if they are "10", the middle area is indicated.

The bit b28 is reserved.

In the bit b29, a value indicating reflectivity is recorded.

In the bit b30, a value indicating a tracking method (for example, groove tracking) is recorded.

In the bit b31, a value indicating a sector format type (for example, a CLV format) is recorded.

In this manner, as the header information of the sector, the attributes of the sector are recorded. In particular, the process (to be described later) is related to the zone type. For example, when a certain sector contained in the data zone is changed to a middle area by the rewriting of the user data, in that sector, the value of the above-described zone type is rewritten.

1-2 Dual-layer disc

Here, in a recordable DVD, a dual-layer DVD having two recording layers is considered. The dual-layer DVD has a structure in which two recording layers serving as die-change recording films or phase-change recording films are layered with a comparatively small spacing in between.

Figure 3:
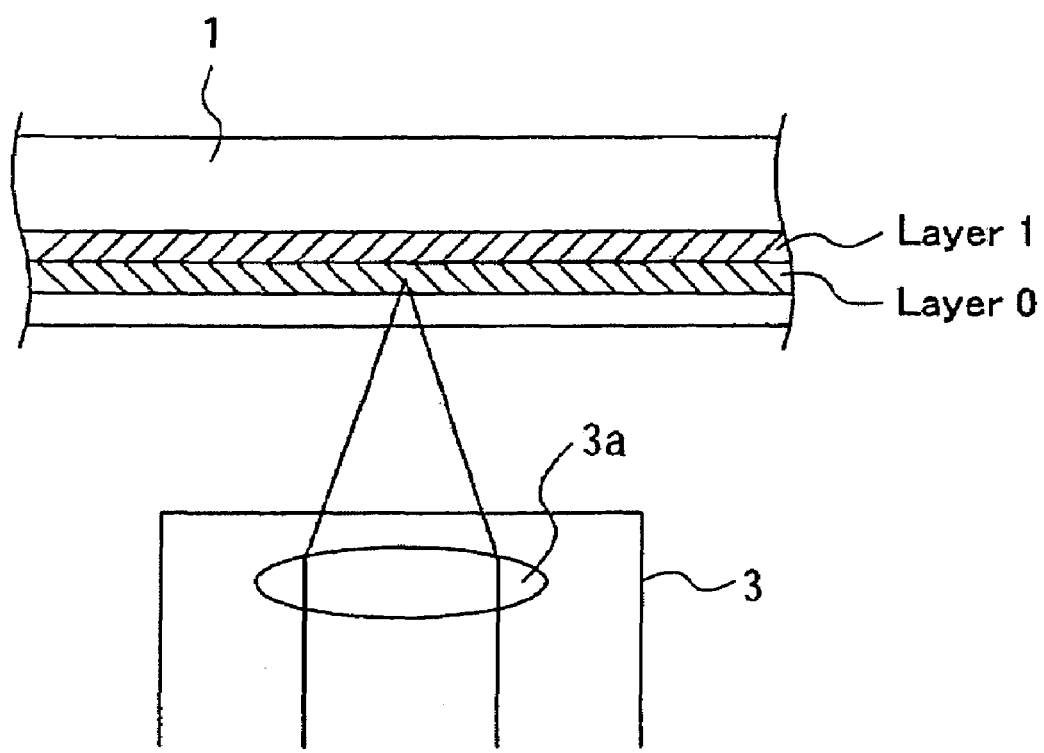
FIG. 3 is an illustration of a dual-layer disc.

FIG. 3 schematically shows a state in which the layer 0 and layer 1 are layered as two recording layers in the disc 1.

During recording on such a dual-layer disc, laser light which is emitted from an optical pickup 3 of the disk drive unit via an objective lens 3a is focused on one of the recording layers, and a signal is recorded in the recording layer.

When viewed from the optical pickup 3 side, the layer 0 is a recording layer nearer thereto, and the layer 1 is a recording layer farther thereto.

In the case of the dual-layer disc, two recording methods of a parallel track path and an opposite track path may be used.

Figure 4A:
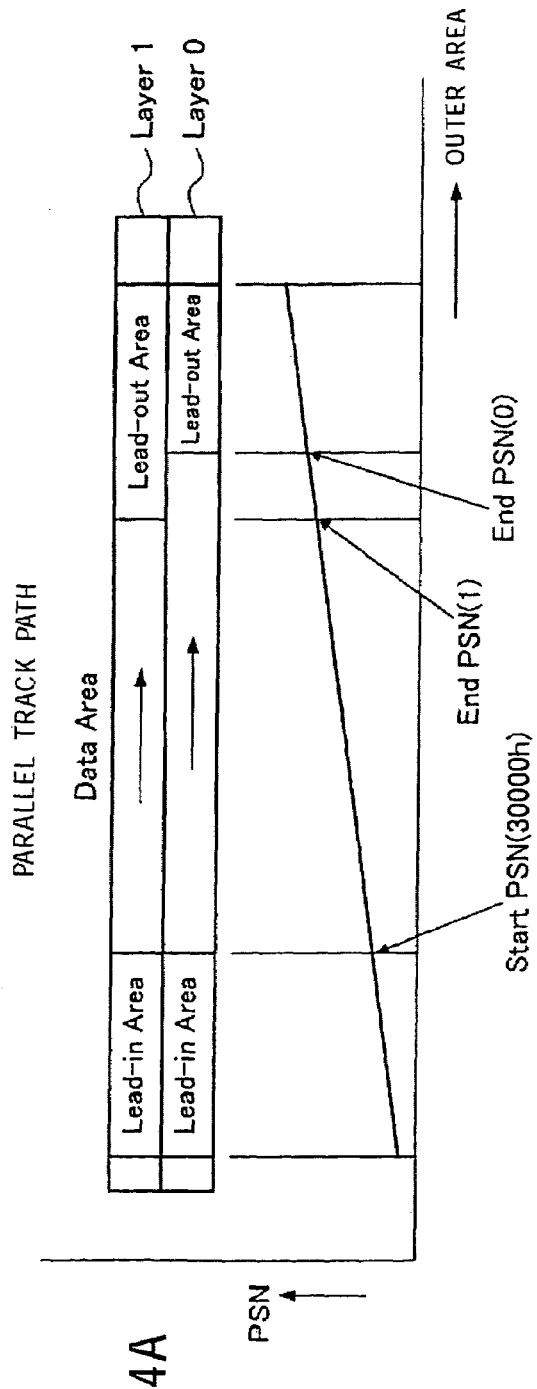
FIGS. 4A and 4B are illustrations of a parallel track path.
Figure 4B:
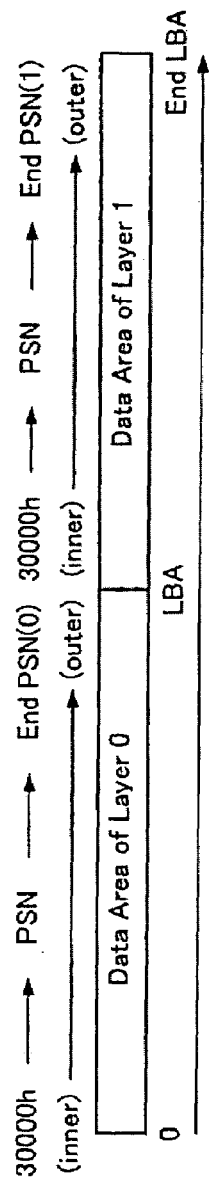

FIGS. 4A and 4B show the parallel track path.

As described above, the physical sector number PSN is an actual address recorded on the disc surface. In comparison, the logical block address LBA is an address assigned to the data logical array handled by the computer. The PSN and LBA have a one-to-one correspondence.

In the case of the parallel track path shown in FIG. 4A, for both the layers 0 and 1, the lead-in area, the data area, and the lead-out area are formed from the inner area toward the outer area.

For recording data, recording is performed from the start PSN (=30000h) of the inner area of the layer 0 up to the end PSN(0) which is the end of the data area of the layer 0. Thereafter, the recording is performed in the recording sequence from the start PSN (=30000h) of the inner area of the layer 1 up to the end PSN(1) on the outer area side.

As shown in FIG. 4B, the logical block address LBA is continuously assigned in sequence in the direction from the inner area of the layer 0 up to the outer area and further in the direction from the inner area of the layer 1 up to the outer area.

The case of the opposite track path is shown in FIGS. 5A and 5B. In the disc employing the opposite track path, the recording sequence is such that recording starts from the inner area of the layer 0 up to the end of the layer 0, and thereafter, recording proceeds from the outer area toward the inner area.

As shown in FIG. 5A, in the case of the opposite track path, in the layer 0, the lead-in area, the data area, and the middle area are formed from the inner area toward the outer area. In the layer 1, the middle area, the data area, and the lead-out area are formed from the outer area toward the inner area.

For recording data, recording is performed from the start PSN (=30000h) of the inner area of the layer 0 up to the end PSN(0) which is the end of the data area of the layer 0. Thereafter, the recording is performed in the recording sequence from the outer area (the reversed end PSN(0) of the data area of the layer 1 up to the end PSN(1) of the inner area.

As shown in FIG. 5B, the logical block address LBA is continuously assigned in sequence in the direction from the inner area of the layer 0 up to the outer area, and thereafter, in the layer 1, the logical block address LBA is continuously assigned in sequence in the direction from the outer area up to the inner area in such a manner as to loop back.

In the opposite track path, the trace of the optical spot during recording and reproduction proceeds from the inner area toward the outer area in the layer 0, and in the layer 1, the trace proceeds from the outer area toward the inner area. Therefore, in the recording tracks formed in the wobbling grooves on the disc, the spiral direction is in the reverse direction between the layer 0 and the layer 1.

As described above, in the parallel track path and the opposite track path, there is a difference in the method of physically storing data (sequence).

In the case of the opposite track path, a middle area is added in the periphery outer from the inter-layer loopback portion. This is due to the following reasons. In the case of the opposite track path, a lead-in area is formed in the layer 0, and a lead-out area is formed in the layer 1. For this reason, in the area outer from the data area, a lead-in area and a lead-out area are not formed. On the other hand, in the read-only device, since pits recorded on the disc surface are read, servo cannot be applied in the pit-free area, and data cannot be stably read. For this reason, an area serving as a guard becomes necessary. From this necessity, a middle area is formed in the outer area and, for example, dummy data is recorded.

1-3 ADIP Structure

The structure of ADIP information recorded as wobbling grooves will now be described below.

Figure 6A:
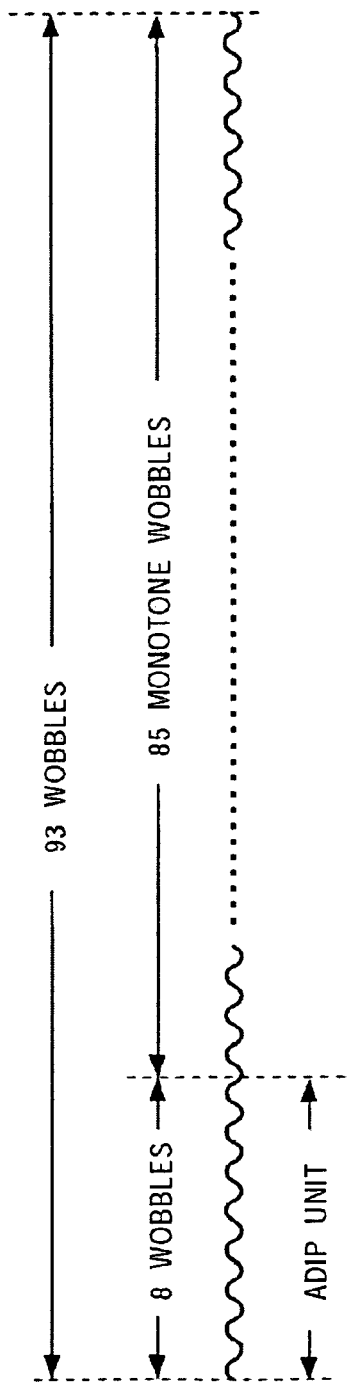
FIGS. 6A and 6B are illustrations of ADIP information.

FIG. 6A shows the unit of wobbling. One wobble corresponds to an interval of 32 channel bits, and 93 wobbles of 8 wobbles and 85 monotone wobbles form a unit having one ADIP unit. 85 monotone wobbles are wobble intervals of 85 waves which are not modulated. As a result of the first 8 wobbles being made to be wobbles which are phase-modulated according to information, they have information as one ADIP unit.

Figure 6B:
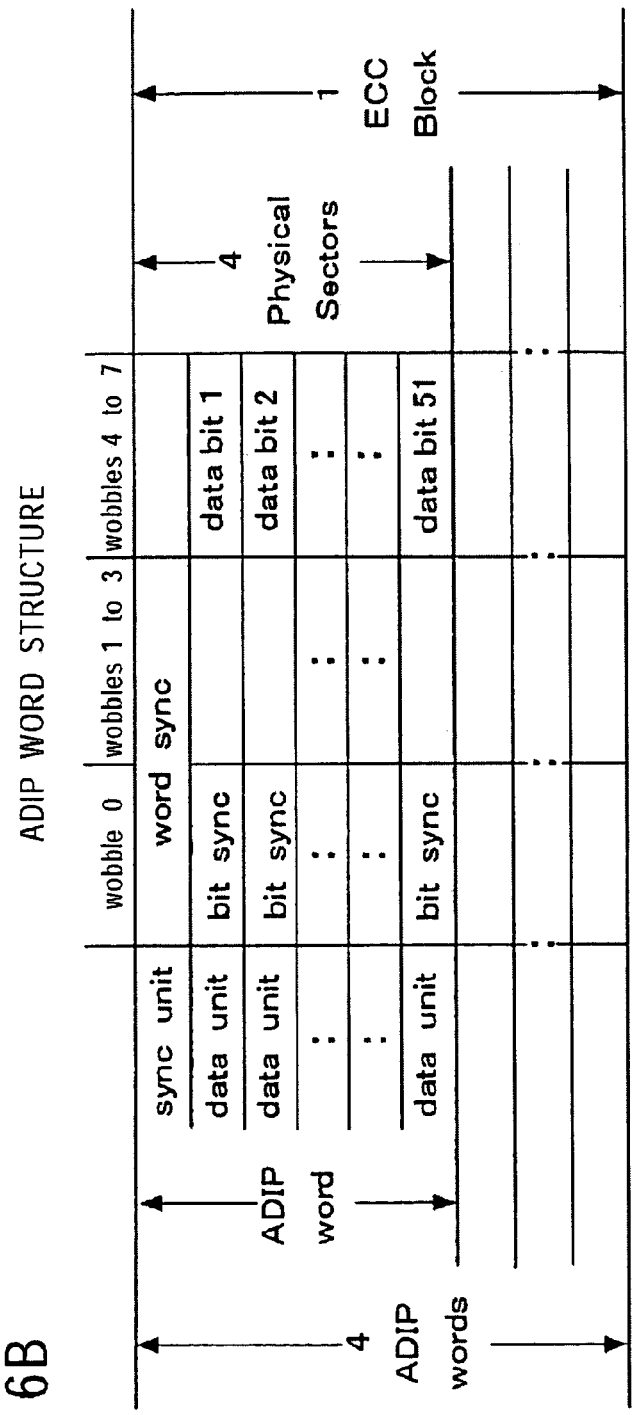

FIG. 6B shows the structure of an ADIP word.

As described above, one ADIP unit is formed by 8 wobbles. 52 ADIP units are collected to form one ADIP word.

"Wobble 0", "wobbles 1 to 3", and "wobbles 4 to 7" in FIG. 6B indicate each of the 8 wobbles as the ADIP unit.

The first ADIP unit of the ADIP word is made to be a sync unit, and "wobble 0" and "wobbles 1 to 3" are wobbles which are phase-modulated as word sync.

The second and subsequent ADIP units in the ADIP word are each a data unit. "Wobble 0" indicates bit sync, and "wobbles 4 to 7" indicate data bits ("1" or "0" as data). One ADIP word made up of 52 ADIP units corresponds to an interval of 4 physical sectors. Then, one ECC block as ADIP information is formed by 4 ADIP words.

Figure 7:
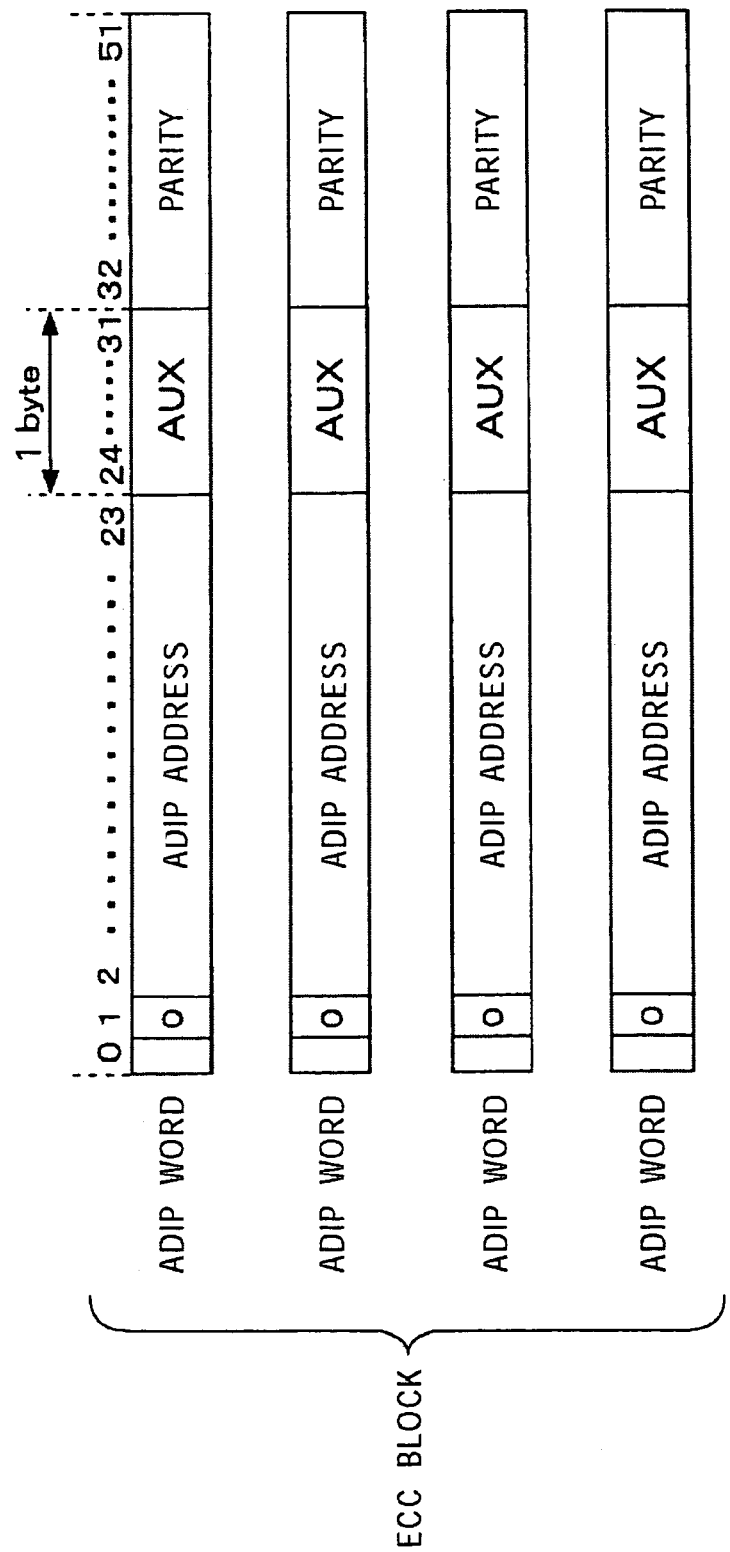
FIG. 7 is an illustration of ECC block units of ADIP.

FIG. 7 shows 4 ADIP words forming an ECC block. 51-bit data (data bits 1 to 51), excluding the word sync, is extracted from one ADIP word in the manner described above, and the ADIP address is recorded by the data bits 2 to 23.

The data bits 24 to 31 are AUX data.

The data bits 32 to 51 are an ECC parity.

The ADIP address by the data bits 2 to 23 are recorded over the whole of the information zone.

As the ADIP information in the lead-in zone, PFI (Physical Format Information) is recorded by 1-byte AUX data per ADIP word (4-byte AUX data in one ECC unit).

This PFI is one information unit by 256 bytes. That is, AUX data, 4 bytes of which are obtained for each ECC block, is collected for the amount of 256 bytes, and PFI shown in FIG. 8 is read out. Such PFI is repeatedly recorded a predetermined number of times by using AUX data in the lead-in zone.

As the content of PFI is shown in FIG. 8, in the PFI, at individual byte positions, various kinds of physical format information, such as the disc category/version number, the disc size, the disc structure, the recording density, data zone allocation, disc application code, extended information indicator, the disc manufacturer ID, medium type ID . . . , is contained.

This PFI makes it possible to obtain various kinds of information about the disc, such as the disc type, the size, the zone structure, the linear velocity information during the recording and reproduction operation, etc.

The information of the data zone allocation at the byte positions 4 to 15 is shown in detail in FIG. 9.

As shown in FIG. 9, in the three bytes at the byte positions 5 to 7, the start PSN (Physical Sector Number) in the whole data zone is recorded.

In the three bytes at the byte positions 9 to 11, the largest PSN in the whole data zone is recorded.

In the dual-layer disc (DVD+R, DVD+RW) of this example, in particular, in the three bytes at the byte positions 13 to 15, the largest PSN of the data zone of the layer 0 is recorded. That is, they are the largest positions which can be used as the data zone in the layer 0.

Each PSN indicated by these pieces of information is as follows in terms of the dual-layer disc of FIGS. 4A, 4B, 5A, and 5B.

The start PSN of the data zone in which the data zones of the layers 0 and 1 are combined is indicated by the "start PSN" in FIGS. 4A, 4B, 5A, and 5B.

The largest PSN of the data zone in which the data zones of the layers 0 and 1 are combined is indicated by the "end PSN(1)" in FIGS. 4A, 4B, 5A, and 5.

The largest PSN of the data zone of the layer 0 is indicated by the "end PSN(O)" in FIGS. 4 and 5.

That is, in this example, as a result of the largest PSN of the layer 0 being recorded in the PFI, the maximum address of the area of the layer 0, where the user data can be recorded, is shown. Furthermore, for the layer 1, since the maximum address of the area where the user data can be recorded is shown by the largest PSN of the data zone, after all, the fact that the information as the largest PSN of the layer 0 is contained in the PFI makes it possible to determine the maximum address of the data zone in each recording layer on the basis of the PFI.

That is, in a recording medium, which is of a recordable type such as DVD+R and DVD+RW and which has a plurality of recording layers, the maximum address of the user data recordable area (data zone) of each recording layer is recorded by the physical format information by wobbling grooves. As a result, in the recording and reproduction apparatus, the information allows the maximum address of the data zone of each layer to be confirmed.

1-4 Lead-in Management Information

In the lead-in zone (lead-in area), the management information of the disc is recorded. As the management information, the physical format information of the disc, file management information of the user data recorded on the disc, etc., are recorded. For example, in a write-once medium such as DVD+R, management information is recorded in the lead-in zone when the user data is determined by a session closing (or disc closing) process. On the other hand, in a rewritable disc such as DVD+RW, the management information is recorded in the lead-in zone when the user data is determined by a finalizing process. However, since the disc is rewritable, there are cases in which lead-in writing (updating) is performed at disc ejection time, after user data is written, and at other various kinds of times. What time the lead-in writing is performed depends on the disc writing application which is started up in, for example, a host device.

In DVD+R and DVD+RW, the management information to be written into the lead-in has data of the structure such as that shown in FIG. 10.

In FIG. 10, regarding the structure as the management information within the data zone, the address position is indicated by the start PSN, and the data size is indicated by the number of sectors.

As shown in FIG. 10, within the lead-in zone, excluding the reserved (non-defined) area, an initial zone, an inner disc test zone, an inner drive test Zone (Layer 0), a guard zone 1, an inner disc identification zone, a reference code zone, a buffer zone 1, a control data zone, a buffer zone 2 are formed.

Here, in the control data zone indicated as (2) for 3072 sectors, the contents of the PFI in the above-described ADIP information are recorded. That is, they are physical format information. The PFI, as shown in FIG. 9, contains information of the start PSN of the data zone, the largest PSN of the data zone, and the largest PSN of the layer 0. In the case of a rewritable DVD+RW disc, the value of the largest PSN of the layer 0, of the PFI to be written into the control data zone when the lead-in is updated is updated according to the inter-layer transition position of the user data at that time.

Within the inner disc identification zone indicated by (1) in FIG. 10, the information of the format disc control block (FDCB) shown in FIG. 11 is contained.

This FDCB has a structure of one ECC block (16 sectors). The position of each content is indicated by the sector number within the ECC block and the byte position within the sector.

In this FDCB, excluding the reserved (non-defined), information of a "content descriptor", "unknown content descriptor actions", "drive ID", "FDCB update count", "formatting status and mode", "last written address", "last verified address", "bitmap start address", "bitmap length", "disc ID", "application dependent", "link of DCBs", and "formatting bitmap" is recorded.

Here, as indicated by (3), the formatting status and mode of 4 bytes of the byte positions D44 to D47 of the layer 0 is a field for recording various kinds of status flags, and is defined as shown in FIG. 12.

That is, the byte position D44 is a formatting status flag, and the format state (unformatted, partially formatted, formatted, etc.) of the disc is indicated by the flag.

The byte position D45 is a verification status flag, which indicates a verification status.

The byte position D46 indicated by (4) is a recording status flag, which indicates a recording status of the zone.

The content of the recording status flag of this 1 byte (bits 0 to 7) is shown in FIG. 13.

The bit position 7 is a lead-in status, which indicates the recording state of the lead-in.

The bit positions 6 and 5 are a lead-out status, which indicates the recording state of the lead-out.

In the case of this example, in particular, the bit position 4 is a middle status, which indicates the formation state of the middle area.

For example, in the middle status, "0" indicates that the middle area is not yet formed (not yet updated), and "1" indicates that the middle area is formed (updated). The initial value is "0".

As described earlier in the description of the sector structure, as the header information of the sector, the attributes of the sector are recorded. When the attributes of the sector are changed to the middle area as a result of rewriting the user data, in that sector, the value of the zone type is rewritten. When the attributes of the sector are made to be the middle area in that manner, a middle status flag is updated by assuming that the middle area is formed.

Therefore, depending on this middle status flag, it can be confirmed as to whether or not the middle area according to the current user data recording status (the current inter-layer transition position) has already been formed.

2. Disc Drive Unit 2-1 Unit Configuration

A description will now be given below of a disk drive unit according to this embodiment, which is compatible with a dual-layer disc (dual-layer DVD+RW, etc.) such as that described above.

Figure 14:
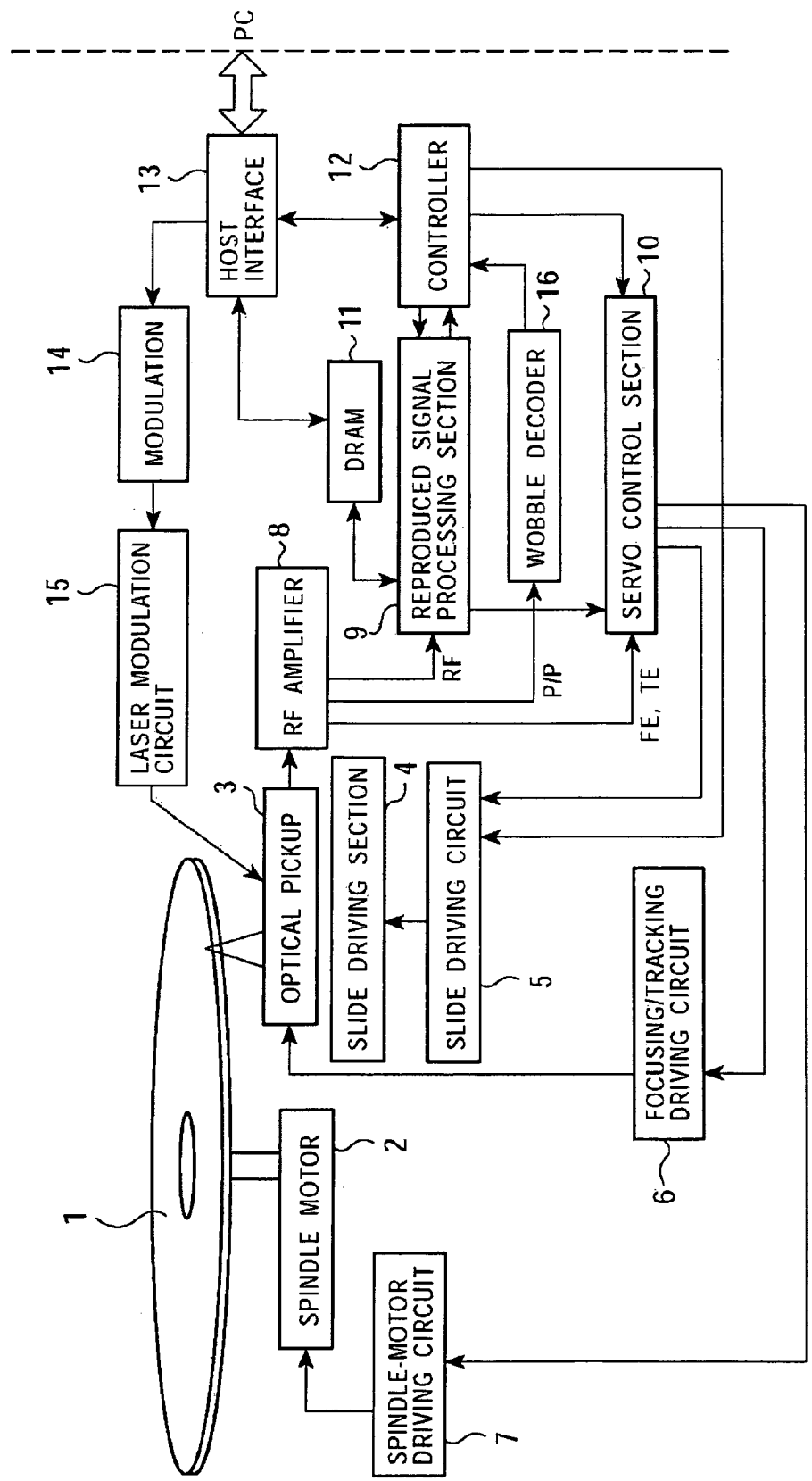
FIG. 14 is a block diagram of a recording and reproduction apparatus according to an embodiment of the present invention.

FIG. 14 is a block diagram showing the main portion of a disk drive unit of this example.

The disc 1 is placed in a turntable (not shown). During the recording and reproduction operation, the disc 1 is rotated by a spindle motor 2 at a constant linear velocity (CLV) or at a constant angular velocity (CAV). Then, reading of the data recorded on the disc 1 in the form of embossed pits, in the form of die-change pits, or in the form of phase-change pits is performed by the pickup 3.

Formed inside the pickup 3 are a laser diode serving as a laser light source, a photodetector for detecting reflected light, an objective lens which becomes the output end of the laser light, an optical system for radiating laser light onto the disc recording surface via the objective lens and for guiding the reflected light to the photodetector, and a two-axis mechanism for movably holding the objective lens in the tracking direction and in the focusing direction. Furthermore, the entire pickup 3 is movable in the radial direction of the disc by a sliding driving section 4.

The reflected light information from the disc 1 is detected by the photodetector, whereby it is converted into an electrical signal proportional to the amount of received light, and this signal is supplied to an RF amplifier 8.

The RF amplifier 8 includes a current-to-voltage conversion circuit in such a manner as to correspond to the output current from a plurality of photodetectors inside the optical pickup 3, a matrix computation/amplifier circuit, etc., and generates a necessary signal by a matrix computation process. For example, an RF signal, which is reproduced data, a focusing error signal FE for servo control, a tracking error signal TE, etc., are generated.

The reproduced RF signal output from the RF amplifier 8 is supplied to a reproduced signal processing section 9, and the focusing error signal FE and the tracking error signal TE are supplied to a servo control section 10.

In the recorded area of the recordable disc and the ROM-type disc, the tracking error signal is detected by a DPD method. On the other hand, in the non-recorded area of the recordable disc, the tracking error signal is detected by a push-pull method. For this reason, the method of generating a tracking error signal in the RF amplifier 8 is switched according to the disc type and the area on the disc (recorded/non-recorded).

In the recordable disc, tracks are formed by wobbling grooves. The ADIP information is recorded by wobbles of grooves in the manner described above. Wobble components can be obtained as, for example, a push-pull signal in the RF amplifier 8, and this push-pull signal is supplied to a wobble decoder 16 in order to detect the ADIP information.

In the reproduced signal processing section 9, binarization, PLL clock generation, a decoding process for an EFM+ signal (8-16 modulation signal), an error correction process, etc., are performed on the reproduced RF signal obtained at the RF amplifier 8.

The reproduced signal processing section 9 performs a decoding process and an error correction process by using a DRAM 11. The DRAM 11 is also used as a cache for storing data obtained from a host interface 13 and for transferring data to the host computer.

Then, the reproduced signal processing section 9 stores the decoded data in the DRAM 11 as a cache memory.

As the reproduced output from this disk drive unit, the data buffered in the DRAM 11 is read and transferred for output.

Furthermore, in the reproduced signal processing section 9, subcode information, address information, management information, and additional information are extracted from the information obtained by EFM+demodulation and error correction on the RF signal, and these pieces of information are supplied to a controller 12.

In the wobble decoder 16, the ADIP information (LPP information, ATIP information, sector ID information, etc., depending on the disc type) by the wobbling grooves is decoded from the push-pull signal so as to extract the address information (ADIP address) and physical format information (PFI) recorded in the wobbling grooves, and these are supplied to the controller 12.

The controller 12, which is formed by, for example, a microcomputer, controls the entire apparatus.

The host interface 13 is connected to a host device such as an external personal computer, and performs communication of reproduction data, a read/write command, etc., with the host device.

That is, the reproduced data stored in the DRAM 11 is transferred and output to the host device via the host interface 13. Furthermore, the read/write command, the recording data, and other signals from the host device are buffered in the DRAM 11 or are supplied to the controller 12 via the host interface 13.

As a result of the write command and recording data being supplied from the host device, recording on the disc 1 is performed.

When data is to be recorded, in a modulation section 14, processing for recording is performed on the recording data buffered in the DRAM 11. That is, processing, such as error correction code addition and EFM+modulation, is performed.

Then, the recording data which is modulated in this manner is supplied to a laser modulation circuit 15. The laser modulation circuit 15 drives the semiconductor laser inside the optical pickup 3 according to the recording data, causes laser output corresponding to the recording data to be performed, and writes data on the disc 1.

During this recording operation, the controller 12 is controlled so that laser light is radiated by recording power from the pickup onto the recording area of the disc 13.

When the disc 1 is of a write-once type in which a die-change film is used as a recording layer, pits (recording marks) due to changes in die are formed by laser radiation of the recording power.

Furthermore, in the rewritable disc in which the disc 1 is a phase-change recording layer, the crystal structure of the recording layer changes due to the applied heat of the laser light, and phase-change pits (recording marks) are formed. That is, various kinds of data are recorded by changing the presence and the length of the pit. Furthermore, when laser light is radiated onto the portion where pits are formed again, the crystal state which is changed when data is recorded is returned to the original state by the applied heat, and the pits disappear, thereby erasing the data.

The servo control section 10 generates various kinds of servo driving signals for focusing, tracking, thread, and spindle, from the focusing error signal FE and the tracking error signal TE from the RF amplifier 8, a spindle error signal SPE from the reproduced signal processing section 9 or the controller 12, so that servo operation is performed.

More specifically, a focusing driving signal and a tracking driving signal are generated in accordance with the focusing error signal FE and the tracking error signal TE, and these signals are supplied to a focusing/tracking driving circuit 6. The focusing/tracking driving circuit 6 drives the focusing coil and the tracking coil of the two-axis mechanism in the pickup 3. As a result, the tracking servo loop and the focus servo loop by the pickup 3, the RF amplifier 8, the servo control section 10, the focusing/tracking driving circuit 6, and the two-axis mechanism are formed.

When the focus servo is turned on, the focusing searching operation must be performed. The focusing searching operation is such that the position at which the S-shaped curve of the focusing error signal FE is obtained while forcedly moving the objective lens in a state in which the focus servo is off is detected. As is well known, the linear area within the S-shaped curve of the focusing error signal is the range where the position of the objective lens can be retracted to the focused position by closing the focus servo loop. Therefore, by detecting the retractable range while forcedly moving the objective lens as a focus searching operation and by turning on the focus servo at that timing, hereafter, focus servo operation in which the laser spot is maintained in a focused state is realized.

In the case of this example, there are cases in which the disc 1 is formed as a dual-layer structure of the layer 0 and the layer 1 in the manner described above.

As a matter of course, when recording and reproduction is performed on the layer 0, the laser light must be focused with respect to the layer 0. Furthermore, when recording and reproduction is performed on the layer 1, laser light must be focused with respect to the layer 1.

Such a movement of the focus position between the layers 0 and 1 is performed by focus jumping operation.

The focus jumping operation is performed in such a manner that, when the laser light is focused in one of the layers, the objective lens is forcedly moved with focus servo being off, and when the focus retraction range for the other layer is reached (when the S-shaped curve is observed), focus servo is turned on.

The servo control section 10 further supplies the spindle driving signal generated in accordance with the spindle error signal SPE to a spindle motor driving circuit 7. The spindle motor driving circuit 7 applies, for example, a three-phase driving signal to the spindle motor 2 in accordance with the spindle driving signal, so that the spindle motor 2 is rotated. Furthermore, the servo control section 10 generates a spindle driving signal in accordance with a spindle kick/brake control signal from the controller 12, so that operation, such as the starting, stoppage, acceleration, deceleration, etc., of the spindle motor 2 by the spindle motor driving circuit 7 is performed.

Furthermore, the servo control section 10 generates, for example, a slide error signal obtained as low-frequency components of the tracking error signal TE and a slide driving signal under the access execution control by the controller 12, and supplies these signals to a slide driving circuit 5. The slide driving circuit 5 drives the slide driving section 4 in accordance with the slide driving signal. Although not shown, the slide driving section 4 has a mechanism formed of a main shaft for holding the pickup 3, the sled motor, transmission gears, etc. The slide driving circuit 5 drives the slide driving section 4 in accordance with the slide driving signal, causing the pickup 3 to slide as required.

During recording, the laser modulation circuit 15 performs driving so that laser light in accordance with recording data is output from the laser diode inside the optical pickup 3 in the manner described above. During recording, in a high-level laser power, laser output modulated by the recording laser is performed, and during reproduction, continuous laser output is performed by a low-level laser power.

For this reason, the laser modulation circuit 15 includes a write strategy circuit for obtaining a laser modulation signal and performing waveform shaping in accordance with recording data, a laser driving circuit for driving the laser diode, and a power control circuit for controlling the laser power so as to be made constant.

As the laser power during reproduction and during recording, laser power control is performed so that predetermined reproduction laser power and recording laser power are stably output. That is, although not shown, a monitor signal of the laser power is supplied from the monitor detector inside the pickup to the power control circuit inside the laser modulation circuit 15, and the power control circuit compares the monitor signal with a reference level (the setting level as the reproduction laser power or the recording laser power) so as to control the output of the laser driving circuit and to stabilize the laser power output from the laser diode.

Furthermore, the reproduction laser power and the recording laser power must be set to an optimum value according to the disc 1. For this reason, for example, when the disc 1 is loaded, test recording/reproduction is performed on the disc 1, and a process for searching for the optimum value of the laser power is performed. For example, jitter and an error rate are checked while changing the laser power in a stepwise manner so as to search for the optimum laser power. The recording laser power and the reproduction laser power as the found optimum value are set as the above-described reference level in the power control circuit inside the laser modulation circuit 15. As a result, during recording and during reproduction, optimum laser power control is performed.

In the dual-layer disc, optimum laser power is set for each recording layer. Therefore, the process for setting the optimum laser power is performed for each recording layer.

2-2 Processing for middle area

A description will now be given below of examples of processing for the middle area by the disk drive unit.

Figure 16:
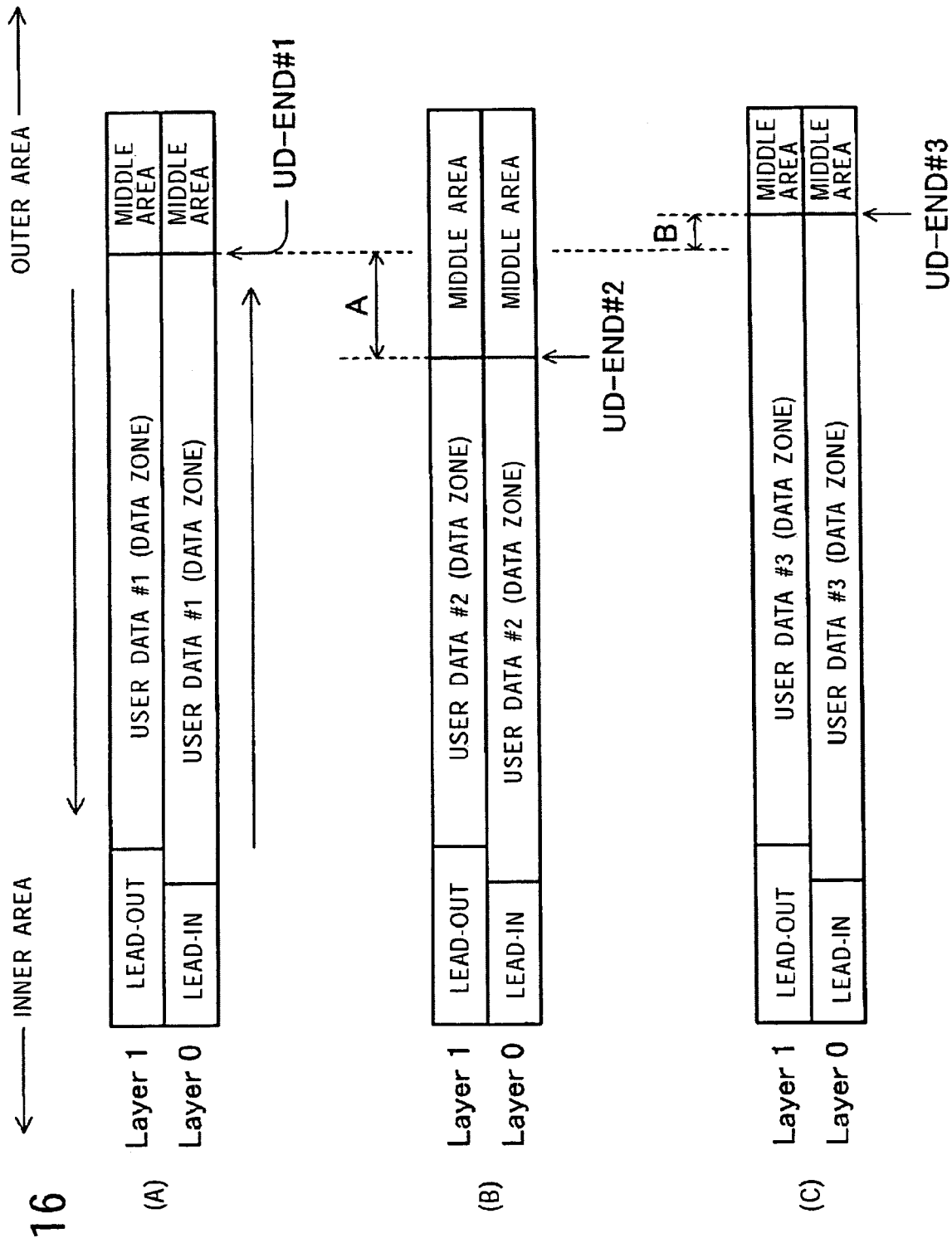
FIG. 16 is an illustration of the change of middle areas.

For example, as described in part (a) of FIG. 16, when user data is recorded on the disc 1 of the opposite track path, a middle area is formed in a portion outer from the inter-layer transition position UD-END #1 in the layers 0 and 1.

The formation of the middle area is a process for forming a sector in which the zone type (see FIG. 2) is a value "11" indicating a middle area in the range where the middle area may be formed. The middle area is formed toward the outer area with the inter-layer transition position (the inter-layer loopback address) being one end. As described in parts (a), (b), and (c) of FIG. 16, the range of the middle area may vary in accordance with the rewriting of the user data.

Which time the middle area should be formed is possible variously according to the application of the host device that specifies the operation of the disk drive unit. In this example, a description is given below by assuming that the middle area is formed as necessary during a finalizing time.

Figure 15A:
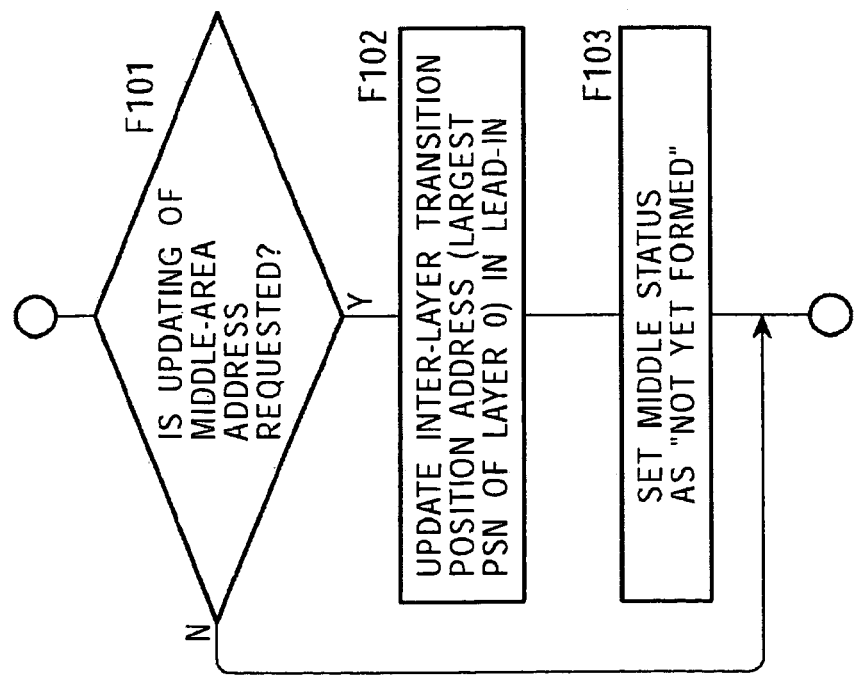
FIGS. 15A and 15B are flowcharts showing processing for forming a middle area according to the embodiment of the present invention.
Figure 15B:
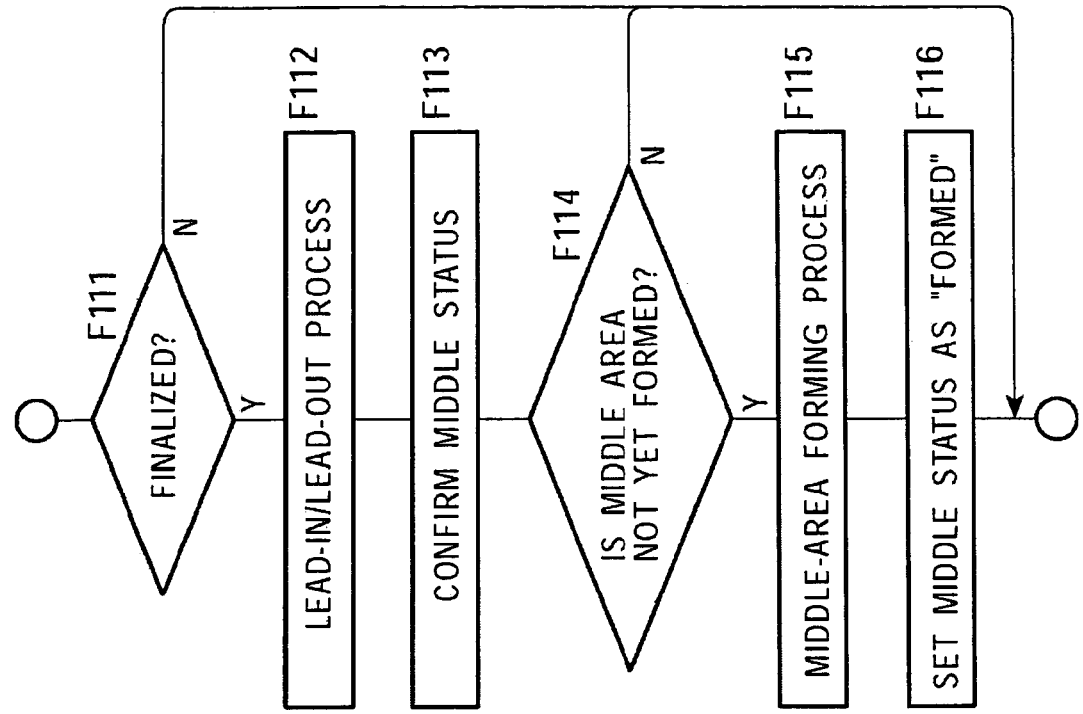

FIGS. 15A and 15B are flowcharts showing processing for a middle area in the controller 12.

FIG. 15A shows processing in a case where a middle-area address updating request is issued from the host device.

The middle-area address updating request is a change of the inter-layer transition position, and is issued, for example, as a command while the user data is being recorded.

When the host device instructs the disk drive unit to perform disc copying using a DVD+RW disc, the user data of the copying source disc is recorded onto the disc 1 loaded into the disk drive unit. However, due to the convenience of the recording data size of the copying source disc, there are cases in which the inter-layer transition position is desired to be changed. Of course, in addition to such a situation, there are cases in which inter-layer loopback is performed without using up to the largest PSN at which the user data can be recorded in the layer 0.

The host device instructs the position at which the transition from the layer 0 to the layer 1 is desired as a middle-area address updating request.

In response, with respect to the user data recording process, the controller 12 performs inter-layer loopback (the transition of the recording from the layer 0 to the layer 1) at the specified address. In particular, with respect to the middle area, the processing of FIGS. 15A and 15B is performed.

That is, in response to the middle-area address updating request, the process proceeds from step F101 to step F102, where the value of the inter-layer transition position address is updated within the management information in the lead-in. More specifically, the value of the largest PSN (see FIG. 9) of the layer 0 within the PFI (the PFI copied from the ADIP information of FIG. 8) recorded in the control data zone (FIG. 10) of the lead-in is updated.

Next, in step F103, the value (see FIG. 13) of the middle status in the lead-in is set to "0" indicating that the middle area is not yet formed.

As a result of performing in advance the processing of FIG. 15A (and the initial value of the middle status is "0"), for example, in accordance with the change in the inter-layer transition position, when the middle area is not yet formed (is not formed at all, or the updating of the middle area in accordance with the user data recording for this time is not performed), the value of the middle status becomes "0" indicating that the middle area is not yet formed.

Next, referring to FIG. 15B, the processing of the controller 12 during a finalizing process is described.

For example, when a finalizing process is performed in accordance with instructions from the host device, the process of the controller 12 proceeds from step F111 to step F112, where data for the lead-in and the lead-out required for the finalizing process is written.

Then, in this example, since the middle area is formed during the finalizing process if necessary, processing for the middle area is performed in step F113 and subsequent steps.

Initially, in step F113, the value of the middle status recorded in the lead-in is checked. If the value of the middle status indicates "formed", the process ends at step F114.

On the other hand, if the value of the middle status indicates "not yet formed", the process proceeds from step F114 to step F115, where a middle area forming process is performed.

In this case, for example, by referring to the value of the "largest PSN of the layer 0" recorded in the PFI in the lead-in, access is performed up to the inter-layer transition position, and an operation for rewriting each sector to the attributes of the middle area (the value of the zone type of FIG. 2 is changed to the value of the middle area) is performed in a predetermined range outer from that position.

When the middle area in the layer 0 and the layer 1 is formed as a result of this processing, in step F116, the value of the middle status in the lead-in is updated to the value "1" indicating "formed", thus completing the processing.

In FIG. 15B, in the finalizing procedure, the writing is performed in the lead-in and the lead-out in step F112 above. Alternatively, this process may be performed in step F116 or subsequent steps.

Furthermore, when a determination as to whether or not the middle area has been formed is made by referring to the middle status and the middle area has not been formed, the processes for forming the middle area (F113 to F116) may be performed not only during the finalizing time, but also during disc ejection and in accordance with the instructions from the host. Alternatively, the processes may be performed when the writing of the user data is completed.

According to the processing of this example, whether or not the middle area has been formed can be confirmed only by checking the middle status in step F113.

That is, if all the middle areas are reproduced to make a determination as to whether or not the middle area has been formed, a problem arises in that the processing time becomes longer. According to this example, the process for confirming whether or not the middle area has been formed can be performed easily and very quickly. As a result, a specific process, including a middle-area confirmation process such as a finalizing process, can be sped up.

Furthermore, the middle status is set to a value indicating "not yet formed" in a situation where the inter-layer transition position is changed due to user data recording (F103 in FIG. 15B). Also, the middle status is set to a value indicating "formed" in accordance with the fact that the middle area is formed on the basis of the address value indicating the inter-layer transition position (F116 in FIG. 15B). As a result, even if the circumstances, such as ejection and power off before the finalizing process (before the middle area is formed) are allowed for, the value of the middle status accurately indicates the actual middle-area formation state. Therefore, the above-described confirmation by checking the middle status becomes accurate.

As shown in step F102, in the management information in the lead-in, the address value indicating the new inter-layer transition position is recorded as the "the largest PSN of the layer 0" according to the change in the inter-layer transition position. For this reason, even if power stoppage or disc ejection occurs before the finalizing process and the disk drive unit (controller 12) does not store the new inter-layer transition position in accordance with the user data writing with regard to the disc, the position of the new middle area can be recognized from the largest PSN of the layer 0 on the basis of the management information in the lead-in of the disc.

Therefore, when a middle area needs to be formed, such as when proceeding to step F115, the middle-area forming process can be realized accurately and easily by using the address as the new inter-layer transition position as a reference.

3. Modifications

Modifications and application examples of the present invention are possible variously.

Although a case is described in which a DVD+RW disc is used as a dual-layer rewritable disc of the DVD system, of course, the present invention can also be applied to a dual-layer disc such as a DVD-RW or DVD+RAM disc in a similar manner.

In the present invention, in addition to DVD-system discs, other kinds of discs of the CD system and the Blue-ray Disc™ system, and further media other than discs are useful as rewritable recording media having a plurality of recording layers.

The dual-layer disc in the present invention includes a so-called laminated both-sided disc.

Furthermore, although in the embodiment a dual-layer disc is used, the present invention can be applied to a recording medium having three or more recording layers.

What is claimed is:

1. A recording medium having a plurality of recording layers, on which data can be rewritten, and on and from which user data can be recorded and reproduced by an opposite track path method in which the address advancing direction is the opposite direction between odd-numbered recording layers and even-numbered recording layers, said recording medium comprising:
    a guard intermediate area to be formed by assuming, as one end, the inter-layer transition position at which the recording proceeds from a certain recording medium to the next recording medium when user data is to be recorded; and
    a management information area in which intermediate-area management information indicating whether or not said guard intermediate area has already been formed is to be recorded.

2. A recording medium according to claim 1, further comprising a lead-in area in which said management information area is to be formed, wherein, in said lead-in area and said guard intermediate area, a zone type for indicating each area is recorded.

3. A recording and reproduction apparatus incorporating a recording medium having a plurality of recording layers, on which data can be rewritten, on and from which user data can be recorded and reproduced by an opposite track path method in which the address advancing direction is the opposite direction between odd-numbered recording layers and even-numbered recording layers, and which has a structure including a guard intermediate area to be formed by assuming, as one end, the inter-layer transition position at which the recording proceeds from a certain recording medium to the next recording medium when user data is to be recorded; and a management information area in which intermediate-area management information indicating whether or not said guard intermediate area has already been formed is to be recorded, said recording and reproduction apparatus comprising:
    a recording and reproduction section for recording and reproducing data on and from each of said recording layers;
    a management information updating processing section for updating said intermediate-area management information when said guard intermediate area is to be formed according to the user data recording state or when said guard intermediate area is formed; and
    an intermediate-area formation processing section for determining whether or not said guard intermediate area needs to be formed by referring to said intermediate-area management information and for forming said guard intermediate area according to the determination result.

4. A recording and reproduction apparatus according to claim 3, wherein, when said inter-layer transition position changes as a result of recording the user data, said management information updating processing section records an address value indicating a new inter-layer transition position in said management information area and updates the value of said intermediate-area management information to a value indicating "not yet formed".

5. A recording and reproduction apparatus according to claim 4, wherein said management information updating processing section updates the value of said intermediate-area management information to a value indicating "formed" in accordance with the fact that said guard intermediate area is formed on the basis of the address value indicating said inter-layer transition position.

6. A recording and reproduction method incorporating a recording medium having a plurality of recording layers, on which data can be rewritten, on and from which user data can be recorded and reproduced by an opposite track path method in which the address advancing direction is the opposite direction between odd-numbered recording layers and even-numbered recording layers, and which has a structure including a guard intermediate area to be formed by assuming, as one end, the inter-layer transition position at which the recording proceeds from a certain recording medium to the next recording medium when user data is to be recorded; and a management information area in which intermediate-area management information indicating whether or not said guard intermediate area has already been formed is to be formed, said recording and reproduction method comprising:
    a first updating step of updating the value of said intermediate-area management information to a value indicating "not yet formed" when said guard intermediate area is to be formed according to the user data recording state;
    a determination step of determining whether or not said guard intermediate area needs to be formed by referring to said intermediate-area management information;
    a forming step of forming said guard intermediate area according to the result of said determination step; and
    a second updating step of updating the value of said intermediate-area management information to a value indicating "formed" according to the formation of said guard intermediate area.

7. A recording and reproduction method according to claim 6, wherein, in said first updating step, when said inter-layer transition position changes as a result of recording the user data, the address value indicating the new inter-layer transition position is recorded in said management information area, and the value of said intermediate-area management information is updated to a value indicating "not yet formed".

8. A recording and reproduction method according to claim 7, wherein, in said second updating step, the value of said intermediate-area management information is updated to a value indicating "formed" according to the formation of said guard intermediate area on the basis of the address value indicating said inter-layer transition position.

* * * * *